US012689172B2

(12) United States Patent
Oguma

(10) Patent No.: US 12,689,172 B2
(45) Date of Patent: Jul. 21, 2026

(54) OPTICAL AMPLIFIER

(71) Applicant: NEC Corporation, Tokyo (JP)

(72) Inventor: Takefumi Oguma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 630 days.

(21) Appl. No.: 18/268,081

(22) PCT Filed: Feb. 16, 2022

(86) PCT No.: PCT/JP2022/006278
§ 371 (c)(1),
(2) Date: Jun. 16, 2023

(87) PCT Pub. No.: WO2022/201991
PCT Pub. Date: Sep. 29, 2022

(65) Prior Publication Data
US 2024/0055819 A1 Feb. 15, 2024

(30) Foreign Application Priority Data

Mar. 23, 2021 (JP) ................................. 2021-048281

(51) Int. Cl.
*H01S 3/00* (2006.01)
*G02F 1/31* (2006.01)
(Continued)

(52) U.S. Cl.
CPC ............ *H01S 3/06754* (2013.01); *G02F 1/31* (2013.01); *H01S 3/0014* (2013.01);
(Continued)

(58) Field of Classification Search
CPC ............... H01S 3/06754; H01S 3/0014; H01S 3/094011; H01S 3/0941; H01S 3/1301; G02F 1/31; H04B 10/25
See application file for complete search history.

(56) References Cited

U.S. PATENT DOCUMENTS

2002/0149840 A1*  10/2002  So ........................ H01S 3/13013
                                                                  359/337.1
2008/0002878 A1*   1/2008  Meiyappan ............ H04N 13/25
                                                                  382/294
(Continued)

FOREIGN PATENT DOCUMENTS

EP            621663  A1    10/1994
JP      H05-218974  A      8/1993
(Continued)

OTHER PUBLICATIONS

International Search Report for PCT Application No. PCT/JP2022/006278, mailed on May 10, 2022.

*Primary Examiner* — Mark Hellner
(74) *Attorney, Agent, or Firm* — Sughrue Mion, PLLC

(57) ABSTRACT

An optical amplifier according to the present disclosure includes a first excitation light coupler, a first optical amplification medium, a first optical switch configured to output the optical communication signal output from the first optical amplification medium to either a first branch path HGP or a second branch path, and a second optical switch configured to transmit the optical communication signal transmitted through the branch path to downstream, and the first branch HGP path includes a second optical amplification medium, a second excitation light coupler configured to synthesize the optical communication signal and the excitation light directed towards the second optical amplification medium, and a first gain equalizer, and the second branch path includes a third excitation coupler configured to synthesize the optical communication signal and the excitation light directed towards the first optical switch, and a second gain equalizer.

5 Claims, 7 Drawing Sheets

1

(51) Int. Cl.

| | | |
|---|---|---|
| *H01S 3/067* | (2006.01) |
| *H01S 3/094* | (2006.01) |
| *H01S 3/0941* | (2006.01) |
| *H01S 3/13* | (2006.01) |
| *H04B 10/25* | (2013.01) |

(52) U.S. Cl.
CPC ...... *H01S 3/094011* (2013.01); *H01S 3/0941* (2013.01); *H01S 3/1301* (2013.01); *H04B 10/25* (2013.01)

(56) References Cited

U.S. PATENT DOCUMENTS

| | | | | |
|---|---|---|---|---|
| 2011/0085231 A1* | 4/2011 | Bolshtyansky | ..... | H01S 3/06754 |
| | | | | 359/341.33 |
| 2011/0199672 A1* | 8/2011 | Takeyama | .......... | H04B 10/2941 |
| | | | | 359/337 |

FOREIGN PATENT DOCUMENTS

| | | | |
|---|---|---|---|
| JP | 2011-243803 | A | 12/2011 |
| JP | 2012-175091 | A | 9/2012 |
| JP | 2015-128157 | A | 7/2015 |
| JP | 2016-122745 | A | 7/2016 |
| JP | 2016-208358 | A | 12/2016 |
| JP | 2017-059857 | A | 3/2017 |
| JP | 2020-182120 | A | 11/2020 |
| WO | 2005/018065 | A1 | 2/2005 |

* cited by examiner

OPTICAL AMPLIFIER

This application is a National Stage Entry of PCT/JP2022/006278 filed on Feb. 16, 2022, which claims priority from Japanese Patent Application 2021-048281 filed on Mar. 23, 2021, the contents of all of which are incorporated herein by reference, in their entirety.

TECHNICAL FIELD

The present disclosure relates to an optical amplifier, in particular, to an optical amplifier configured to amplify optical signals that are attenuated in optical-fiber transmission paths.

BACKGROUND ART

Optical fibers are used to configure transmission paths for optical communication, but since various losses occur in the transmission paths, optical amplifiers are used to compensate for these losses. In such optical amplifiers, it is required to perform a broadband gain-variable operation while minimizing degradation in the noise figure. In view of the above, Patent Literature 1 discloses an example of a technique related to optical amplifiers.

The optical amplifier described in Patent Literature 1 includes an input port, a bar-cross switch optically coupled to the input port, a first gain stage optically coupled between a first port and an output port of the bar-cross switch, and a secondary gain stage optically coupled between a second port and a third port of the bar-cross switch, in which in the bar state of the bar-cross switch, the secondary gain stage is bypassed and in the cross state of the bar-cross switch, the secondary gain stage and the first gain stage are applied to an input light beam.

CITATION LIST

Patent Literature

Patent Literature 1: Japanese Unexamined Patent Application Publication No. 2017-59857

SUMMARY OF INVENTION

Technical Problem

In optical amplifiers, it is required to perform a broadband gain-variable operation while suppressing the noise figure with a simple configuration. However, the optical amplifier described in Patent Literature 1 uses a complex structure, such as a bar-cross switch, and it cannot be said the optical amplifier has a simple configuration.

Solution to Problem

According to an aspect of the present disclosure, an optical amplifier includes: an input terminal configured to input an optical communication signal; a first excitation light coupler configured to synthesize the optical communication signal and an excitation light; a first optical amplification medium provided downstream of the first excitation light coupler and configured to amplify the optical communication signal by the excitation light; a first optical switch provided downstream of the first optical amplification medium and configured to output the optical communication signal output from the first optical amplification medium to either a first branch path or a second branch path; a second optical switch configured to select either the first branch path or the second branch path and transmit the optical communication signal transmitted through the selected branch path to downstream; and an output terminal provided downstream of the second optical switch and configured to output the optical communication signal, the first branch path including: a second optical amplification medium configured to amplify the optical communication signal by the excitation light; a second excitation light coupler provided downstream of the second optical amplification medium and configured to synthesize the optical communication signal and the excitation light directed towards the second optical amplification medium; and a first gain equalizer provided downstream of the second excitation light coupler and configured to correct gain wavelength characteristics, the second branch path including: a third excitation light coupler configured to synthesize the optical communication signal and the excitation light directed towards the first optical switch; and a second gain equalizer provided downstream of the third excitation light coupler and configured to correct gain wavelength characteristics.

Advantageous Effects of Invention

In an optical amplifier according to the present disclosure, a broadband gain-variable operation can be performed while suppressing the noise figure with a simple configuration.

EXAMPLE EMBODIMENT

First Example Embodiment

Figure 1:
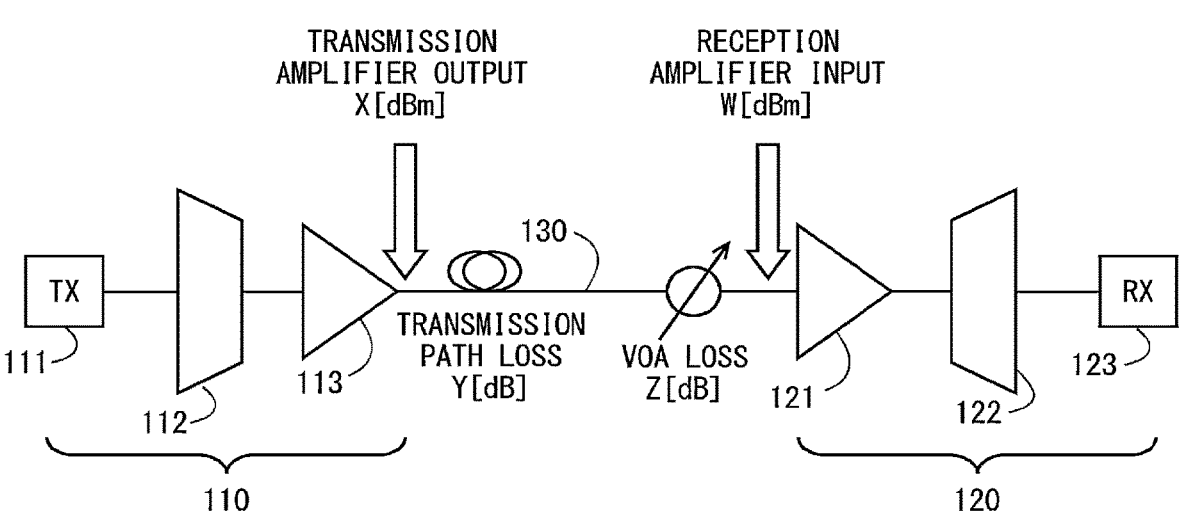
FIG. 1 is a block diagram of a communication system to which an optical amplifier according to a first example embodiment is applied.

Example embodiments of the present disclosure will be described below with reference to the drawings. First, FIG. 1 shows a block diagram of a communication system 100 to which an optical amplifier according to the first example embodiment is applied. As shown in FIG. 1, in the communication system 100, a transmission apparatus 110 and a reception apparatus 120 are connected to each other through an optical transmission path 130.

The transmission apparatus 110 includes a transmission signal generation unit 111, a multiplexer 112, and a transmission amplifier 113. In the transmission apparatus 110, a transmission signal generated by the transmission signal generation unit 111 is transmitted to the transmission amplifier 113 via the multiplexer 112. The transmission amplifier 113 sends out the optical communication signal to the optical transmission path 130 with a power of, for example, XdBm.

The reception apparatus 120 includes a reception amplifier 121, a demultiplexer 122, and a signal reception unit 123. The reception apparatus 120 transmits the optical communication signal received and amplified by the reception amplifier 121 to the signal reception unit 123 via the demultiplexer 122. Here, the power of the optical communication signal received by the reception amplifier 121 is denoted by WdBm.

At this timing, a transmission path loss of YdB occurs in the optical transmission path 130. Meanwhile, a variable attenuator is provided in the optical transmission path 130 or the reception amplifier 121. In this variable attenuator, a VOA loss of ZdB occurs.

An operation of the communication system 100 will now be described. In the communication system 100, in order to keep the power WdBm of the optical communication signal received by the reception amplifier constant regardless of the variation in the transmission path loss YdB, the magnitude of the VOA loss ZdBm is adjusted by a variable attenuator so that X−W=Y+Z becomes constant. The value of the power XdBm of the optical communication signal output by the transmission amplifier 113 varies depending on the number of multiwavelengths. In addition, when the number of multiwavelengths does not change, the power XdBm of the optical communication signal output by the transmission amplifier 113 is constant, and so the VOA loss ZdB becomes constant regardless of the transmission path loss YdB. In contrast, when the transmission path loss YdB is small, the VOA loss ZdB becomes large, and the signal noise in the reception amplifier 121 becomes large despite the small transmission path loss.

Here, in the communication system 100, the reception amplifier 121 has the function of amplifying the optical communication signal attenuated in the optical transmission path 130. In the reception amplifier 121, in order to realize signal amplification with a low noise, it is effective to keep the level of the optical communication signal input to the amplifier as high as possible, but the transmission path loss YdB of the optical transmission path 130 laid in the field is not constant and varies depending on the transmission distance.

Also, an optical amplifier for wavelength division multiplexing transmission generally performs constant gain control. Therefore, the gain in the optical amplifier is constant, and in order to eliminate the variation in the output of the optical amplifier due to the variation in the transmission distance, a variable attenuator is provided in the optical transmission path 130 or inside the reception amplifier 121, and the output of the reception amplifier 121 is adjusted to a desired light level by setting a large amount of attenuation in the case where the transmission path loss YdB is small, and setting a small amount of attenuation in the case where the transmission path loss is large.

In the communication system 100 described above, the amount of attenuation can be set to such a value that the output of the amplifier can be of a desired value while absorbing the variation in the transmission path loss YdB. However, in the communication system 100, when the transmission path loss is small, the amount of attenuation can be set to be large, and as a result, the level of light input to the amplifier decreases and the noise characteristics degrade in spite of the small transmission path loss.

In order to solve this problem, in an optical amplifier 1 described below, the gain is varied according to the loss in the transmission path by dividing an erbium-doped fiber, which is an amplification medium, into blocks having a plurality of different gains via an optical switch and changing the effective length of the erbium-doped fiber by switching the optical switch according to the transmission path loss in the applicable transmission path. By using the optical amplifier 1, it is possible to realize a variable gain operation through which it is possible to deal with the variations in the transmission path loss while minimizing the degradation in the noise characteristics in the region where the transmission path loss is small. Further, regarding the optical amplifier 1, reliability and cost-effectiveness are improved by reducing the number of EDFs used and simplifying the overall configuration. The optical amplifier 1 that can be used as the reception amplifier 121 will be described below.

Figure 2:
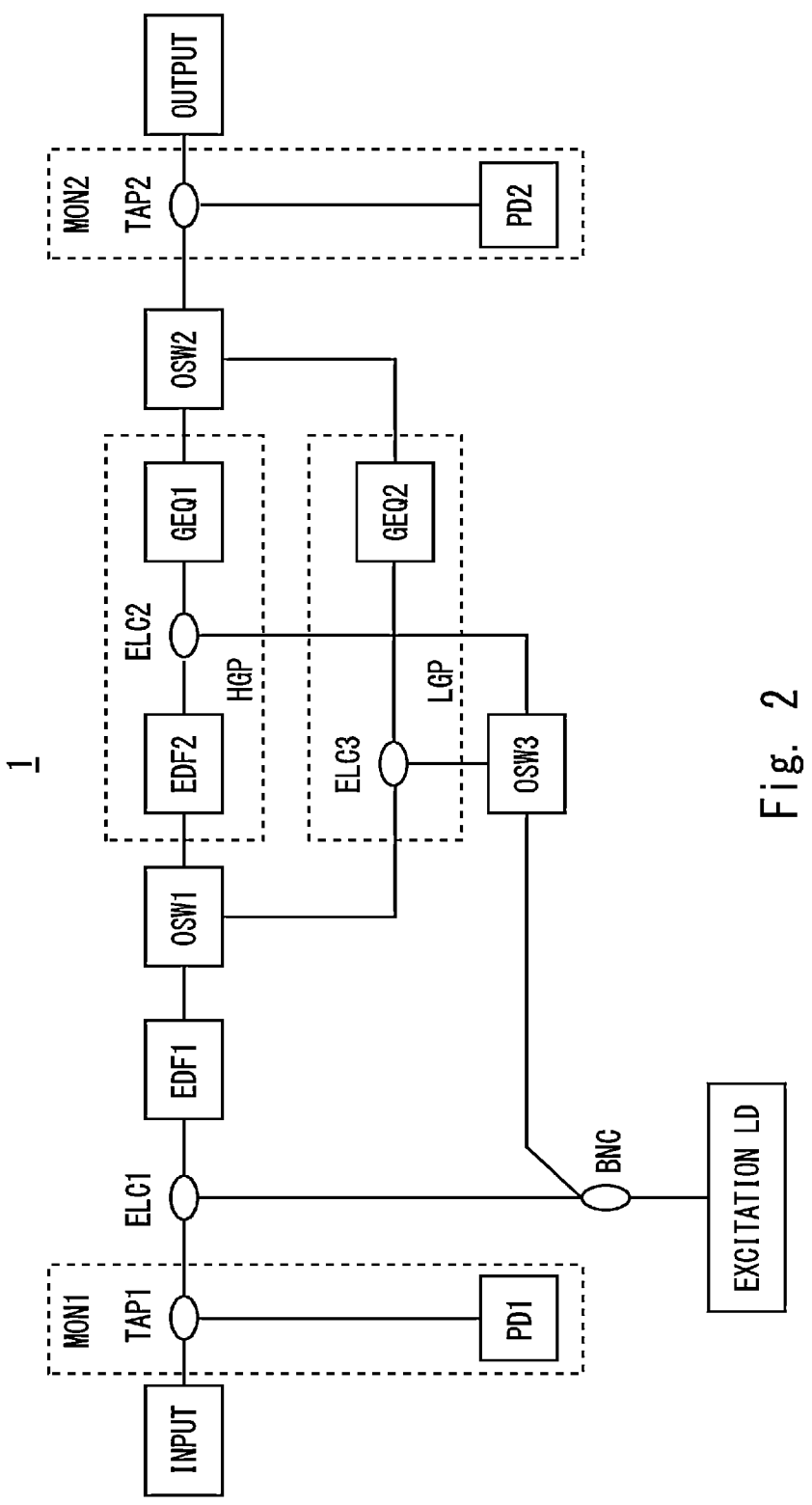
FIG. 2 is a block diagram of an optical amplifier according to the first example embodiment.

FIG. 2 shows a block diagram of the optical amplifier 1 according to the first example embodiment. Although not shown in FIG. 2, a variable attenuator may be provided upstream of the input terminal of the optical amplifier 1.

As shown in FIG. 2, the optical amplifier 1 according to the first example embodiment includes, between the input and output terminals, a first monitor unit (e.g., a monitor unit MON1), a first excitation light coupler (e.g., an excitation light coupler ELC1), a first optical amplification medium (e.g., an erbium-doped fiber EDF1), a first optical switch (e.g., an optical switch OSW1), a second optical amplification medium (e.g., an erbium-doped fiber EDF2), a second excitation light coupler (e.g., an excitation light coupler ELC2), a first gain equalizer (e.g., a gain equalizer GEQ1), a second gain equalizer (e.g., a gain equalizer GEQ), an optical switch (e.g., an optical switch OSW2), a second monitor unit (e.g., a monitor unit MON2), a third optical switch (e.g., an optical switch OSW3), a two-branched coupler BNC, and an excitation laser diode (e.g., an excitation LD).

In the optical amplifier 1 according to the first example embodiment, an erbium-doped fiber with fixed gain is used as the optical amplification medium. The erbium-doped fiber is an erbium-doped fiber in which rare earth metal erbium is added. The erbium-doped fiber is then given an excitation laser that energizes the erbium-doped fiber in order to bring the energy state inside the fiber to a state in which the signal light can be amplified.

The input terminal is an input port to which an optical communication signal is input from the outside. The excitation light coupler ELC1 synthesizes the optical communication signal and an excitation light and transmits them to a circuit provided downstream. Here, in the example shown in FIG. 2, the monitor unit MON1 is provided between the input terminal and the excitation light coupler ELC1. The monitor unit MON1 includes a photodiode PD1 and an optical tap TAP1. In the monitor unit MON1, the optical communication signal branched by the optical tap TAP1 is applied to the photodiode PD1 to detect the optical intensity of the optical communication signal input through the input terminal.

The erbium-doped fiber EDF1 is provided downstream of the excitation light coupler ELC1 and amplifies the optical communication signal by the excitation light. The optical switch OSW1 is provided downstream of the erbium-doped fiber EDF1 and outputs the optical communication signal output from the erbium-doped fiber EDF1 to either a first branch path or a second branch path. In the example shown in FIG. 2, the first branch path is a high-gain path HGP and the second branch path is a low-gain path LGP.

The optical switch OSW2 selects either the first branch path or the second branch path and transmits the optical communication signal transmitted through the selected branch path to downstream. The output terminal is an output port provided downstream of the optical switch OSW2 and outputs the optical communication signal. Here, in the example in FIG. 2, the monitor unit MON2 is provided between the optical switch OSW2 and the output terminal. The monitor unit MON2 includes a photodiode PD2 and an optical tap TAP2. In the monitor unit MON2, the optical intensity of the optical communication signal output through the output terminal is detected by applying the optical communication signal branched by the optical tap TAP2 to the photodiode PD2.

As shown in FIG. 2, the high-gain path HGP provided in the first branch path is provided with the erbium-doped fiber EDF2, the excitation light coupler ELC2 and the gain equalizer GEQ1. The erbium-doped fiber EDF2 amplifies the optical communication signal applied to the first branch path using the excitation light. The excitation light coupler ELC2 is provided downstream of the erbium-doped fiber EDF2 and synthesizes the optical communication signal and the excitation light directed towards the erbium-doped fiber EDF2. The gain equalizer GEQ1 is provided downstream of the excitation light coupler ELC2 and corrects the gain wavelength characteristics. More specifically, the gain equalizer GEQ1 corrects the gain wavelength characteristics of the total gain of the erbium-doped fiber EDF1 and the erbium-doped fiber EDF2.

The low-gain path LGP provided in the second branch path has an excitation light coupler ELC3 and a gain equalizer GEQ2. The excitation light coupler ELC3 synthesizes the optical communication signal and the excitation light directed towards the optical switch OSW1. The gain equalizer GEQ2 is provided downstream of the excitation light coupler ELC3 and corrects the gain wavelength characteristics. More specifically, the gain equalizer GEQ2 corrects the gain wavelength characteristics of the gain of the erbium-doped fiber EDF1.

Also, as shown in FIG. 2, in the optical amplifier 1, the excitation LD emits the excitation light. In the optical amplifier 1, the excitation light is distributed to the optical switch OSW1 and the optical switch OSW3 by the two-branched coupler BNC. Then, the optical switch OSW3 applies the given excitation light to either the excitation light coupler ELC2 or the excitation light coupler ELC3.

Next, the operation of the optical amplifier 1 according to the first example embodiment will be explained. First, in order to realize the optical amplifier 1 having a low noise and a high output, it is necessary to perform bidirectional excitation in the erbium-doped fiber during both a low-gain operation and a high-gain operation.

Figure 3:
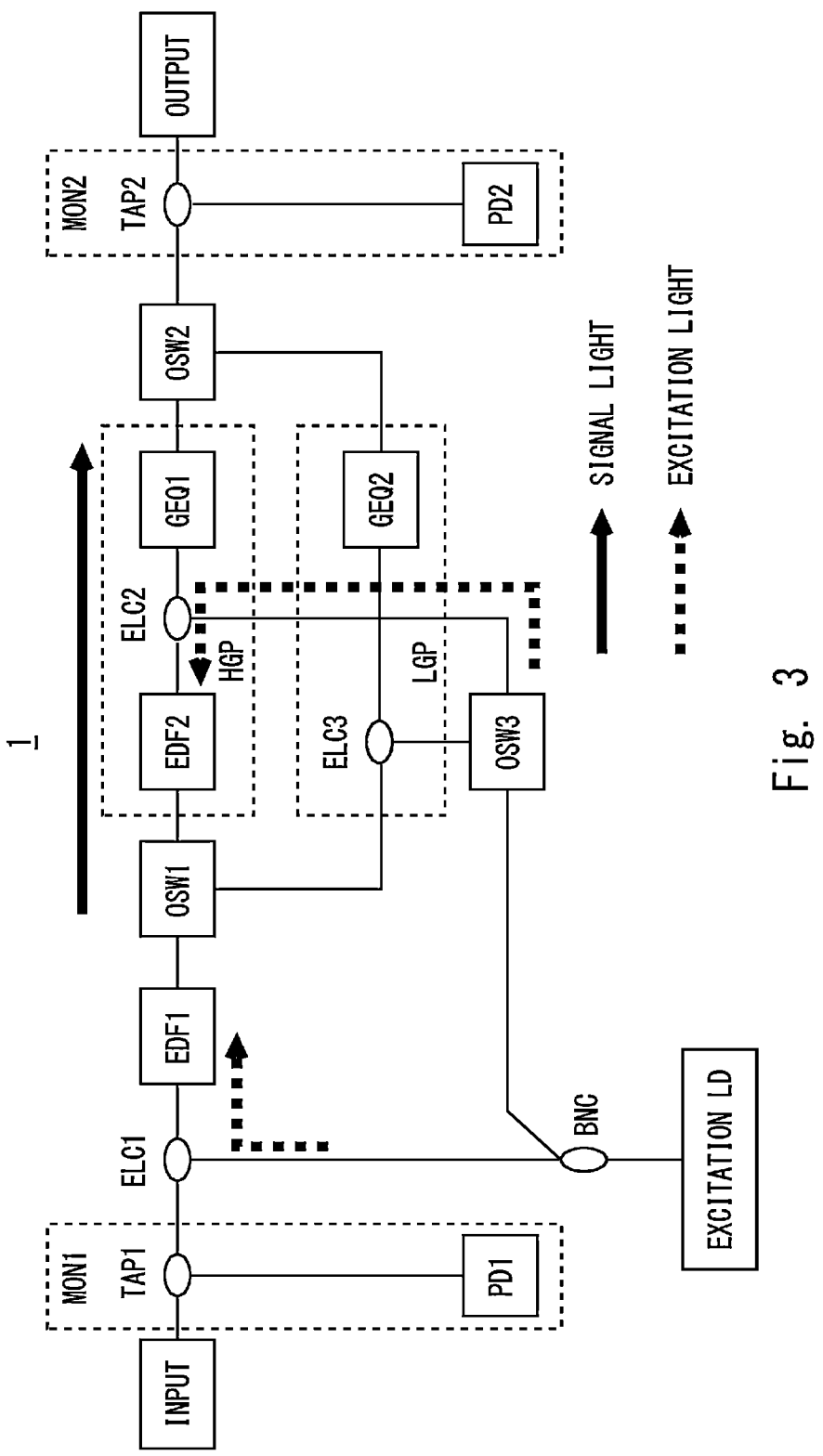
FIG. 3 is a block diagram for explaining operation of the optical amplifier according to the first example embodiment in a high gain mode.
Figure 4:
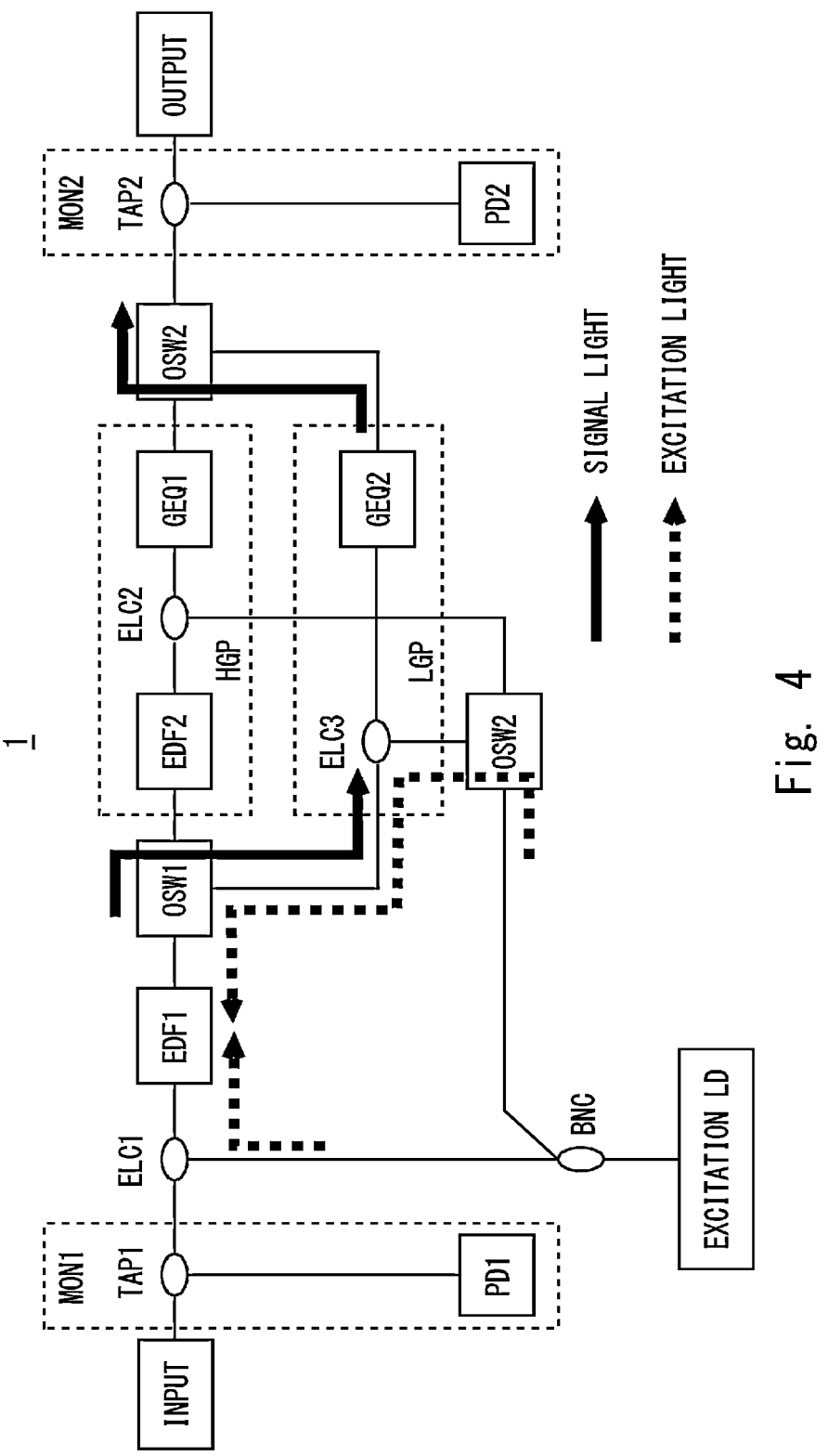
FIG. 4 is a block diagram for explaining operation of the optical amplifier according to the first example embodiment in a low gain mode.

FIG. 3 shows a block diagram for explaining the operation of the optical amplifier in the high-gain mode according to the first example embodiment, and FIG. 4 shows a block diagram for explaining the operation of the optical amplifier in the low-gain mode according to the first example embodiment. In FIG. 3 and FIG. 4, the flow of the optical communication signal is shown by thick solid lines and the flow of the excitation light is shown by thick dotted lines.

As shown in FIGS. 3 and 4, the optical switches OSW1 to OSW3 are made to operate in conjunction with one another in the optical amplifier 1. Thus, in the high-gain operation, the optical amplifier 1 realizes bidirectional excitation by applying the excitation light to the erbium-doped fiber from the upstream side of the erbium-doped fiber EDF1 and from the downstream side of the erbium-doped fiber EDF2. On the other hand, in the low-gain operation, the optical amplifier 1 realizes bidirectional excitation by applying the excitation light to the erbium-doped fiber EDF1 from both the upstream side and the downstream side.

In the optical amplifier 1 according to the first example embodiment, in the high-gain operation, a high gain is realized by passing the optical communication signal to the output terminal through the two erbium-doped fibers, while in the low-gain operation, a low gain is realized by passing the optical communication signal to the output terminal through only one erbium-doped fiber.

Regarding the optical amplifier 1 according to the first example embodiment, reliability and cost-effectiveness are improved by reducing the number of components, and in order to explain this effect clearly, reduction in the number of components of the optical amplifier 1 according to the first example embodiment will be explained with reference to a comparative example.

Figure 5:
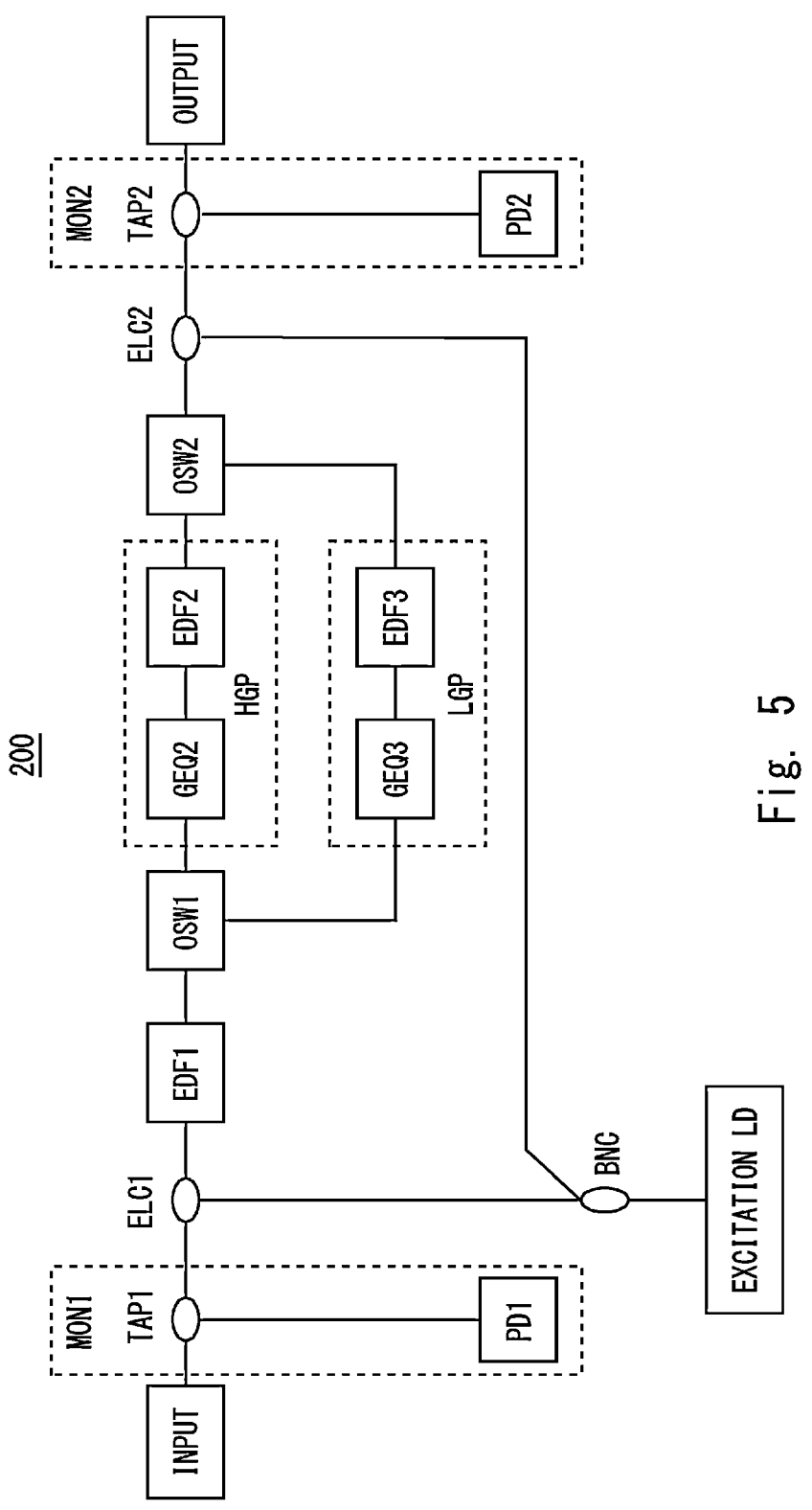
FIG. 5 is a block diagram of an optical amplifier according to a comparative example.

In FIG. 5, a block diagram of an optical amplifier 200 according to a comparative example is shown. In the optical amplifier 200 according to the comparative example shown in FIG. 5, the excitation light coupler ELC2 that guides the excitation light to the erbium-doped fiber from the downstream side is provided downstream of the optical switch OSW2, and the high-gain path HGP and the low-gain path LGP are provided between the optical switch OSW1 and the optical switch OSW2. The high-gain path HGP is equipped with the gain equalizer GEQ2 and the erbium-doped fiber EDF2. The gain equalizer GEQ2 corrects the total gain wavelength characteristics of the erbium-doped fiber EDF1 and the erbium-doped fiber EDF2. The low-gain path LGP is equipped with a gain equalizer GEQ3 and an erbium-doped fiber EDF3. The gain equalizer GEQ3 corrects the total gain wavelength characteristics of the erbium-doped fiber EDF1 and the erbium-doped fiber EDF3.

Figure 6:
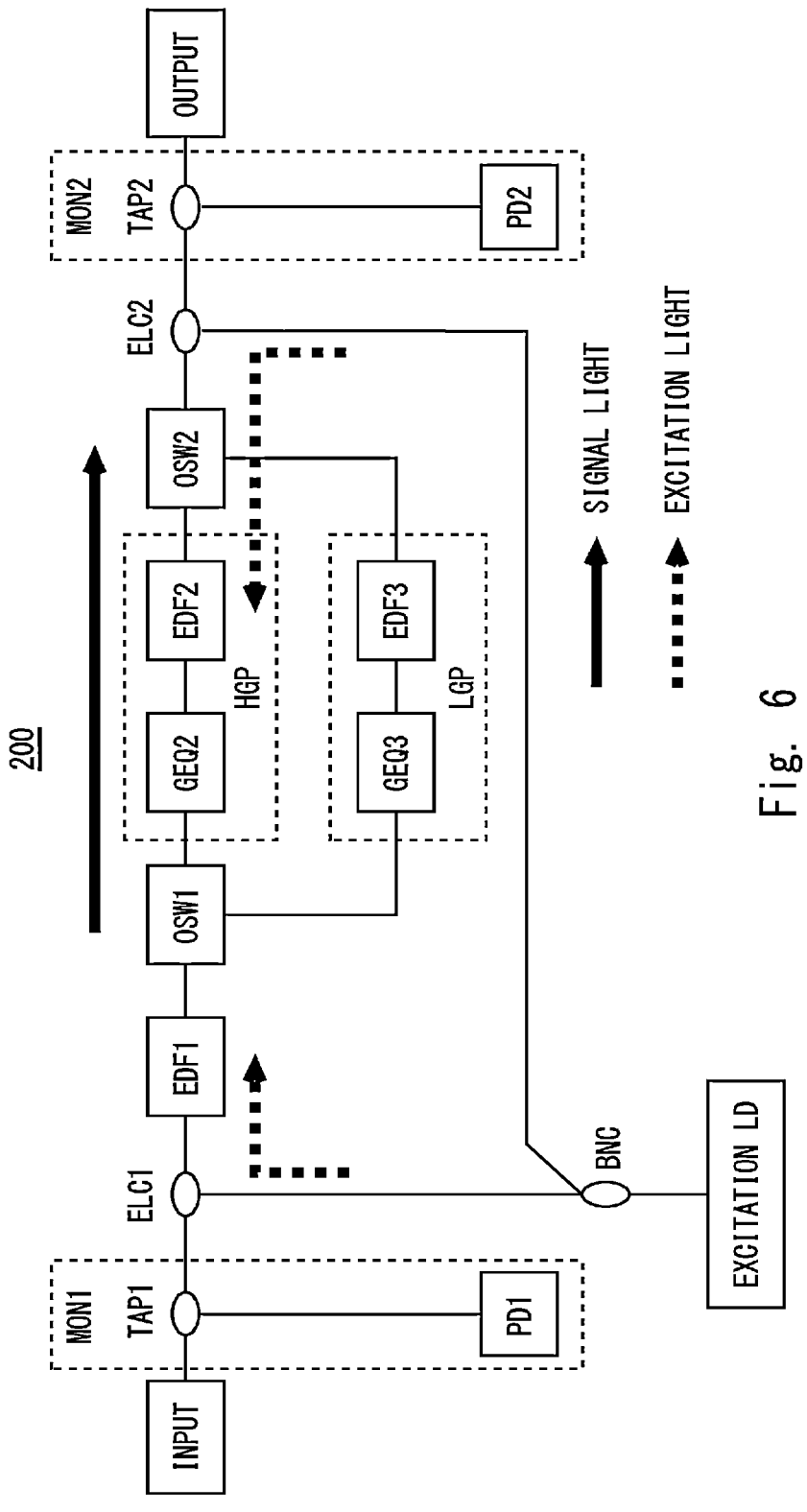
FIG. 6 is a block diagram for explaining operation of an optical amplifier according to a comparative example in a high gain mode.
Figure 7:
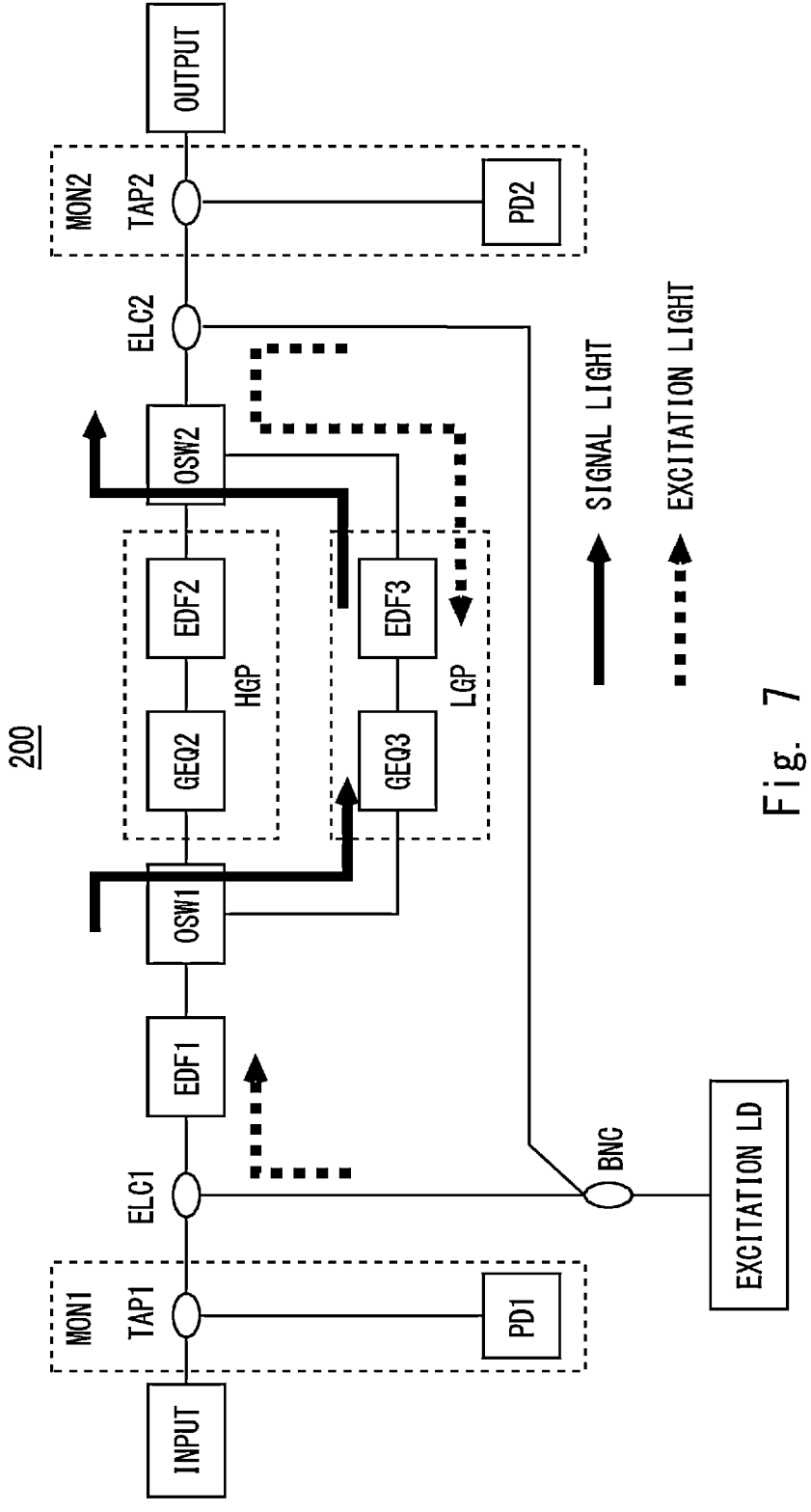
FIG. 7 is a block diagram for explaining operation of an optical amplifier according to a comparative example in a low gain mode.

Next, FIG. 6 shows a block diagram for explaining the operation of the optical amplifier according to the comparative example in the high gain mode, and FIG. 7 shows a block diagram for explaining the operation of the optical amplifier according to the comparative example in the low gain mode. As shown in FIG. 6 and FIG. 7, in the high-gain operation, the optical amplifier 200 according to the comparative example realizes bidirectional excitation by applying the excitation light to the erbium-doped fiber from the upstream side of the erbium-doped fiber EDF 1 and from the downstream side of the erbium-doped fiber EDF 2. On the other hand, in the low-gain operation, the optical amplifier 200 according to the comparative example realizes bidirectional excitation by applying the excitation light to the erbium-doped fiber from the upstream side of the erbium-doped fiber EDF 1 and from the downstream side of the erbium-doped fiber EDF 3.

In the optical amplifier 200 according to the comparative example, the erbium-doped fiber EDF3 is provided downstream of the gain equalizer GEQ3 because the excitation light applied by the excitation light coupler ELC2 cannot pass through the gain equalizer. In other words, when the excitation light coupler ELC2 is provided downstream of the optical switch OSW2 like in the optical amplifier 200 according to the comparative example, it is necessary to provide the erbium-doped fiber in each of the two paths with different gains.

From the above description, in the optical amplifier 1 according to the first example embodiment, the number of erbium-doped fibers can be reduced by providing the excitation light coupler in each of the two paths with different gains. Here, the erbium-doped fiber is a fiber material to which rare earth metal is added, and it is very costly compared to an excitation light coupler or an optical switch, and by dispensing with such an erbium-doped fiber, the optical amplifier 1 can achieve high cost performance.

Also, the optical amplifier 1 according to the first example embodiment does not use a bar-cross switch like in, for example, the optical amplifier described in Cited Document 1. That is, in the optical amplifier 1 according to the first example embodiment, the circuit configuration can be simplified. By simplifying the circuit configuration in this way, reliability of the optical amplifier 1 can be enhanced.

In addition, the optical amplifier 1 according to the first example embodiment exhibits excellent environmental performance by reducing the number of components of the erbium-doped fibers that use rare-earth metals.

The present disclosure has been described above with reference to the example embodiments, but the present disclosure is not limited by any of the above descriptions. The configuration and the details of the present disclosure may be modified in a various ways within the scope of the present disclosure that can be understood by those skilled in the art.

This application claims priority based on Japanese Unexamined Patent Application Publication No. 2021-48281 filed on Mar. 23, 2021, the disclosure of which is herein incorporated by reference in its entirety.

REFERENCE SIGNS LIST

1 Optical Amplifier
TAP1, TAP2 Optical Tap
PD1, PD2 Photodiode
MON1, MON2 Monitor Unit
ELC1, ELC2, ELC3 Excitation Light Coupler
EDF1, EDF2, EDF3 Erbium-Doped Fiber
OSW1, OSW2, OSW3 Optical Switch
GEQ1, GEQ2, GEQ3 Gain Equalizer
BNC Two-Branched Coupler
100 Communication System
110 Transmission Apparatus
111 Transmission Signal Generation Unit
112 Multiplexer
113 Transmission Amplifier
120 Reception Apparatus
121 Reception Amplifier
122 Demultiplexer
123 Signal Reception Unit
130 Optical Transmission Path

What is claimed is:

1. An optical amplifier comprising:
an input terminal configured to input an optical communication signal;
a first excitation light coupler configured to synthesize the optical communication signal and an excitation light;
a first optical amplification medium provided downstream of the first excitation light coupler and configured to amplify the optical communication signal by the excitation light;
a first optical switch provided downstream of the first optical amplification medium and configured to output the optical communication signal output from the first optical amplification medium to either a first branch path or a second branch path;

a second optical switch configured to select either the first branch path or the second branch path and transmit the optical communication signal transmitted through the selected branch path to downstream; and
an output terminal provided downstream of the second optical switch and configured to output the optical communication signal,
the first branch path including:
a second optical amplification medium configured to amplify the optical communication signal by the excitation light;
a second excitation light coupler provided downstream of the second optical amplification medium and configured to synthesize the optical communication signal and the excitation light directed towards the second optical amplification medium; and
a first gain equalizer provided downstream of the second excitation light coupler and configured to correct gain wavelength characteristics, the second branch path including:
a third excitation light coupler configured to synthesize the optical communication signal and the excitation light directed towards the first optical switch; and
a second gain equalizer provided downstream of the third excitation light coupler and configured to correct gain wavelength characteristics.

2. The optical amplifier according to claim 1 further comprising:
an excitation laser diode configured to emit the excitation light;
a third optical switch configured to guide the excitation light to either the second excitation light coupler or the third excitation light coupler, and
a two-branched coupler configured to branch the excitation light to both the first excitation light coupler and the third optical switch.

3. The optical amplifier according to claim 1, wherein the first gain equalizer corrects the gain wavelength characteristics of a total gain of the first optical amplification medium and the second optical amplification medium, and
the second gain equalizer corrects the gain wavelength characteristics of the gain of the first optical amplification medium.

4. The optical amplifier according to claim 1, further comprising:
between the input terminal and the first excitation light coupler, a first monitor unit including a first tap configured to branch the optical communication signal input from the input terminal and a first photodiode configured to detect an optical intensity of the optical communication signal branched by the first tap; and
between the second optical switch and the output terminal, a second monitor unit including a second tap configured to branch the optical communication signal output from the output terminal and a second photodiode configured to detect an optical intensity of the optical communication signal branched by the second tap.

5. The optical amplifier according to claim 1, wherein the first optical amplification medium and the second optical amplification medium are erbium-doped fibers.

\* \* \* \* \*